US008689012B1

(12) United States Patent
Bierbaum et al.

(10) Patent No.: US 8,689,012 B1
(45) Date of Patent: Apr. 1, 2014

(54) DIAGNOSTICS FOR SECURE ELEMENTS IN A MOBILE DEVICE (75) Inventors: Christopher J. Bierbaum, Overland Park, KS (US); Robin D. Katzer, Olathe, KS (US); Todd N. Koellner, Overland Park, KS (US); Kevin K. Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1560 days.

(21) Appl. No.: 12/253,762

(22) Filed: Oct. 17, 2008

(51) Int. Cl.
*G06F 11/30* (2006.01)
*G06F 12/14* (2006.01)
*G06F 7/04* (2006.01)
*G06Q 20/00* (2012.01)

(52) U.S. Cl.
USPC ............. 713/193; 713/185; 713/189; 726/2; 726/5; 726/9; 705/64; 705/65; 705/66; 705/67

(58) Field of Classification Search
USPC .......... 726/2, 3; 380/270, 277, 278, 283, 247; 455/410, 411
See application file for complete search history.

(56) References Cited

U.S. PATENT DOCUMENTS

| | | | | |
|---|---|---|---|---|
| 5,649,118 A * | 7/1997 | Carlisle et al. | ................. | 705/41 |
| 5,857,079 A * | 1/1999 | Claus et al. | ...................... | 705/33 |
| 5,907,616 A * | 5/1999 | Brogger et al. | ............... | 713/172 |
| 6,005,942 A * | 12/1999 | Chan et al. | .................... | 713/187 |
| 6,289,324 B1 * | 9/2001 | Kawan | ............................ | 705/41 |
| 7,024,187 B2 * | 4/2006 | Moles et al. | ................. | 455/423 |
| 7,266,848 B2 * | 9/2007 | Moyer et al. | ..................... | 726/29 |
| 7,324,815 B2 * | 1/2008 | Ross et al. | ..................... | 455/425 |
| 7,373,522 B2 * | 5/2008 | Leaming | ....................... | 713/193 |
| 7,413,113 B1 * | 8/2008 | Zhu | ................................ | 235/375 |
| 7,461,249 B1 * | 12/2008 | Pearson et al. | ................ | 713/156 |
| 7,604,162 B2 * | 10/2009 | Li et al. | .......................... | 235/376 |
| 7,730,545 B2 * | 6/2010 | Milne et al. | ..................... | 726/27 |
| 7,775,442 B2 * | 8/2010 | Saarisalo | ....................... | 235/487 |
| 7,797,248 B1 * | 9/2010 | Bierbaum et al. | .............. | 705/66 |
| 8,005,426 B2 * | 8/2011 | Huomo et al. | ............... | 455/41.2 |
| 8,019,365 B2 * | 9/2011 | Fisher | ........................... | 455/466 |
| 8,032,872 B2 * | 10/2011 | Violleau et al. | .............. | 717/149 |
| 8,061,620 B2 * | 11/2011 | Phillips | ......................... | 235/492 |
| 8,099,765 B2 * | 1/2012 | Parkinson | ......................... | 726/5 |
| 8,120,460 B1 * | 2/2012 | Zhu | .............................. | 340/5.73 |

(Continued)

OTHER PUBLICATIONS

Madlmayr, G.; Langer, J.; Kantner, C.; Scharinger, J.;"NFC Devices: Security and Privacy",Third International Conference on Availability, Reliability and Security, 2008. ARES '08. Issue Date: Mar. 4-7, 2008, pp. 642-647. [retrieved from IEEE database on Dec. 16, 2011].*

(Continued)

*Primary Examiner* — Tae Kim (57) ABSTRACT

A method of diagnosing a mobile device is provided. The method comprises obtaining an access key from a key store based on an identity of the mobile device and based on an identity associated with an issuer of a confidential information, wherein the access key is associated with a secure element of the mobile device storing the confidential information. The method also comprises wirelessly transmitting a message from a station associated with the issuer to the mobile device to initiate diagnostics of at least the secure element of the mobile device, the message comprising the access key, wherein the diagnostics are performed by diagnostic instructions stored on the mobile device. The method also comprises displaying the result of the diagnostics.

18 Claims, 6 Drawing Sheets

(56) References Cited

U.S. PATENT DOCUMENTS

| | | | |
|---|---|---|---|
| 8,126,769 B1* | 2/2012 | Bierbaum et al. | 705/13 |
| 8,126,806 B1* | 2/2012 | DiMartino et al. | 705/41 |
| 8,190,087 B2* | 5/2012 | Fisher et al. | 455/41.2 |
| 8,249,654 B1* | 8/2012 | Zhu | 455/558 |
| 8,285,329 B1* | 10/2012 | Zhu | 455/558 |
| 8,423,788 B2* | 4/2013 | Holtzman et al. | 713/189 |
| 8,463,234 B2* | 6/2013 | Lee et al. | 455/410 |
| 2002/0066032 A1* | 5/2002 | Kurumida | 713/201 |
| 2002/0087868 A1* | 7/2002 | King et al. | 713/185 |
| 2004/0029569 A1* | 2/2004 | Khan et al. | 455/414.1 |
| 2004/0124246 A1* | 7/2004 | Allen et al. | 235/492 |
| 2004/0148502 A1* | 7/2004 | Gollner et al. | 713/167 |
| 2004/0206815 A1* | 10/2004 | Tarnovsky et al. | 235/382 |
| 2004/0225888 A1* | 11/2004 | Leaming | 713/193 |
| 2004/0225918 A1* | 11/2004 | Fruhauf et al. | 714/30 |
| 2005/0188360 A1* | 8/2005 | de Jong | 717/136 |
| 2006/0050888 A1* | 3/2006 | Svensson | 380/277 |
| 2006/0120526 A1* | 6/2006 | Boucher et al. | 380/247 |
| 2006/0225136 A1* | 10/2006 | Rounthwaite et al. | 726/26 |
| 2006/0282734 A1* | 12/2006 | Milne et al. | 714/742 |
| 2008/0011828 A1* | 1/2008 | Mysore | 235/380 |
| 2008/0081608 A1* | 4/2008 | Findikli et al. | 455/425 |
| 2009/0113525 A1* | 4/2009 | Rajan et al. | 726/4 |
| 2009/0193491 A1* | 7/2009 | Rao | 726/1 |
| 2009/0247123 A1* | 10/2009 | Lee et al. | 455/410 |
| 2009/0318123 A1* | 12/2009 | Normark et al. | 455/414.4 |
| 2009/0318125 A1* | 12/2009 | Normark et al. | 455/419 |
| 2009/0327398 A1* | 12/2009 | Campbell et al. | 709/202 |
| 2010/0063893 A1* | 3/2010 | Townsend | 705/26 |
| 2010/0197383 A1* | 8/2010 | Rader et al. | 463/25 |

OTHER PUBLICATIONS

Madlmayr, G. ; Langer, J. ; Scharinger, J.; "Managing an NFC Ecosystem", Mobile Business, 2008. ICMB '08. 7th International Conference on Issue Date : Jul. 7-8, 2008 pp. 95-101. [retrieved from IEEE database on Dec. 16, 2011].*

Madlmayr, G.; Langer, J.; Kantner, C.; Scharinger, J.;"NFC Devices: Security and Privacy", Third International Conference on Availablility, Realiability and Security, 2008. ARES 08. Issue Date: Mar. 4-7, 2008, pp. 642-647. [retrieved from IEEE database on Dec. 16, 2011].*

Madlmayr, G.; Langer, J; Scharinger, J;"Managing an NFC Ecosystem", Mobile Business, 2008. ICMB '08. 7th International Conference on Issue Date: Jul. 7-8, 2008 pp. 95-101. [retrieved from IEEE database on Dec. 16, 2011].*

Madlmayr, G., Dillinger, O. ; Langer, J. ; Schaffer, C. ; Kantner, C. ; Scharinger, J. "The benefit of using SIM application toolkit in the context of near field communication applications", Mannagement of Mobile Business, 2007. ICMB 2007. International Conference on the. Jul. 9-11, 2007 pp. 1-5. [retrieved from IEEE database on Dec. 12, 2012].*

Langer, J. , Madlmayr, G., Kantner, C. ; Scharinger, J."NFC Devices: Security and Privacy"; Availability, Reliability and Security, 2008. ARES 08. Third International Conference on. Mar. 4-7, 2008; pp. 642-647. [retrieved from IEEE database on Dec. 12, 2012].*

* cited by examiner

DIAGNOSTICS FOR SECURE ELEMENTS IN A MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Credit card payments, transit card payments, electronic badge codes, and access codes may be provided by electronic devices such as mobile phones and others. For example, a mobile phone or other electronic device having a near field communication (NFC) transceiver may communicate with a point-of-sale (POS) terminal to provide payment information to complete a sales transaction. Alternatively, a mobile phone or other electronic device may communicate with a badge reader at a building entrance to provide an individual access code to gain access to the building. The electronic information that promotes these transactions may be referred to as confidential information. Sometimes the confidential information may be stored in a secure element in the mobile phone or other electronic device. The confidential information may be credit card account information, debit card account information, transit card account information, transit token information, electronic coupon information, electronic loyalty information, electronic badge information, electronic access code information, and other such confidential information. In some embodiments, the confidential information may include executable applications that promote electronic payment by the mobile device, for example an electronic credit card application and/or an electronic transit card application. The secure element may be a reserved portion of memory that cannot be accessed by unauthorized applications, whereby the confidential information is kept secure and unaltered. Alternatively, in some cases, the secure element may be a dedicated chip in the electronic device, for example a smart card chip. Sometimes funds balances may be stored in the secure element, for example transit card fund balances. The secure element may be stored in a reserved area of a random access memory (RAM) coupled to a processor and/or in a reserved area of a processor.

A smart card may be an integrated circuit chip that comprises a processor, a memory or plurality of memories, and an application that executes on the processor to provide secure access to confidential information stored in the memory. Typically, external readers may not access the memory of the smart card directly. Instead, access to the confidential information is provided by the application that enforces appropriate rules for secure access following appropriate financial protocols. Smart cards may encapsulate credit cards, debit cards (also referred to as electronic cash), health account cards, computer and/or building security system access codes, loyalty program access codes (such as frequent flyer points and/or miles), electronic coupon codes, personal identification, and other electronic secure functions. In some embodiments, a smart card may comprise only non-volatile memory, in which case secure access in accordance with mandated transaction protocols may be provided by a secure application external to the smart card.

SUMMARY

In an embodiment, a method of diagnosing a mobile device is provided. The method comprises obtaining an access key from a key store based on an identity of the mobile device and based on an identity associated with an issuer of a confidential information, wherein the access key is associated with a secure element of the mobile device storing the confidential information. The method also comprises wirelessly transmitting a message from a station associated with the issuer to the mobile device to initiate diagnostics of at least the secure element of the mobile device, the message comprising the access key, wherein the diagnostics are performed by diagnostic instructions stored on the mobile device. The method also comprises displaying the result of the diagnostics.

In another embodiment, a method of diagnosing a mobile device is disclosed. The method comprises transmitting a request for an access key from a service station to a provisioning server based on an identity of the mobile device, wherein the access key is associated with a secure element of the mobile device storing a confidential information. The method also comprises the provisioning server transmitting the request for the access key to a remote key store and the provisioning server transmitting the access key to the service station. The method also comprises the service station transmitting the access key to the mobile device and the mobile device executing a diagnostic application that uses the access key to diagnose the secure element, wherein the diagnostic application is stored on the mobile device. The method also comprises presenting the results of the diagnosis of the secure element.

In another embodiment, a mobile device is disclosed. The mobile device comprises a secure element, a processor, a wireless communication transceiver, and a diagnostic application. The wireless communication transceiver exchanges diagnostic messages with a remote diagnostic controller. The diagnostic application, when executed by the processor and in response to the diagnostic messages, performs diagnostics at least on the secure element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, a system and method for diagnosing a malfunctioning mobile device used for making electronic transactions is disclosed. Mobile devices, for example a mobile phone or other portable electronic device, may be used to complete electronic transactions including purchase payments and/or gain access to secure areas. When the electronic transaction functionality stops working, a variety of possible causes may be at fault. The hardware of the electronic device may have failed in such a way as to prevent proper functioning of, for example, a transit card payment functionality. Alternatively, a payment application and/or applet on the mobile device may have a bug or otherwise fail in such a way as to prevent proper functioning of the transit card payment functionality. Alternatively, some other cause may be at fault.

In an embodiment, a user of the malfunctioning mobile device may present the mobile device to an agent or operator associated with an issuer of confidential information, for example an agent of an issuer of a transit card, for diagnosis. The confidential information may be credit card account information, debit card information, transit card account information, transit token information, electronic coupon information, electronic loyalty information, electronic badge information, electronic access code information, and other such confidential information. In some embodiments, the confidential information may include executable applications that promote electronic payment by the mobile device, for example an electronic credit card application and/or an electronic transit card application. In an embodiment, the mobile device, at least temporarily, may not have network connectivity, for example connectivity to a public land mobile network (PLMN) or other radio access network (RAN) of a wireless network. The agent may request an identity of either a subscriber account and/or an identity of the mobile device. The agent enters the identity information into a computer or other item of equipment to request information for initiating diagnostics of the mobile device. In an embodiment, an agent computer requests an access key from a provisioning server associated with provisioning an electronic transaction application or functionality on mobile devices, for example a transit card provisioning server. In an embodiment, the access key may be encrypted using public key encryption techniques so the access key is not revealed to the agent. The provisioning server may request the access key from a key store. The provisioning server returns the access key and any other needed diagnostic information to the agent computer. The agent computer may then communicate with the mobile device, for example using near field communication technology, to launch diagnostics on the mobile device and to provide the access key.

The mobile device, in response to the communication from the agent computer, launches a diagnostic application that performs operations to try to locate the problem that is preventing use of the mobile device to complete electronic transactions. The diagnostic application may run basic sanity checks to check the fundamental health of various hardware components of the mobile device. The diagnostic application may perform basic tests of one or more electronic transaction applications and/or applets of the mobile device. Additionally, the diagnostic application may perform tests on a secure element of the mobile device and/or invoke a separate diagnostic application that is stored in the secure element. In some embodiments, the access to the secure element may require an access key, for example the access key requested from the provisioning server and/or the key store described above. In some scenarios, if the electronic transaction applications and/or applets of the mobile device or a transaction application stored in the secure element are found to be damaged and/or corrupted, the agent computer may reinstall and/or reprovision the electronic transaction applications and/or applets and/or transaction application stored in the secure element.

In some embodiments, a diagnostic application executing on the agent computer or a server computer in communication with the agent computer via a network may perform diagnostics on the mobile device. This may permit more robust and thorough diagnostic checks than may be available from an on-board diagnostic application. This may permit use of more up-to-date diagnostic checks than may be available from the on-board diagnostic application.

Figure 1:
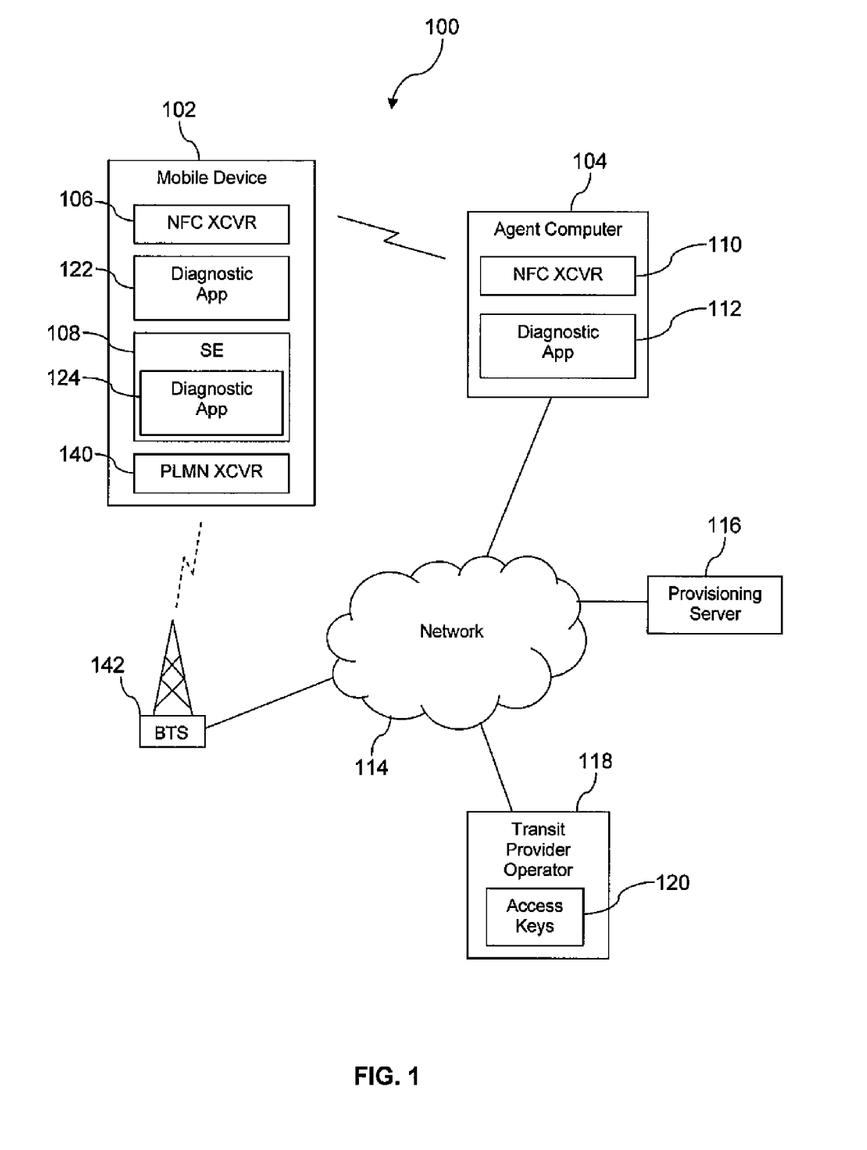
FIG. 1 illustrates an on-board diagnostic system according to an embodiment of the disclosure.

Turning now to FIG. 1, a system 100 for implementing some aspects of the disclosure is discussed. The system 100 comprises a mobile device 102, an agent computer 104, a network 114, a provisioning server 116, a transit provider operator 118, and a store of access keys 120. The mobile device 102 may be any of a variety of devices including a mobile phone, a personal digital assistant (PDA), a media player, a laptop computer, a tablet computer, and other mobile devices. The agent computer 104, the provisioning server 116, and the transit provider operator 118 may communicate with one another via the network 114. The network 114 may comprise any combination of public and private networks and wired and wireless networks. While in FIG. 1 the transit provider operator 118 is depicted, in other embodiments the place of the transit provider operator 118 may be taken by a credit card issuer, a debit card issuer, a bank, a loyalty program manager, a building access control office, or other issuer and/or manager of confidential information.

In an embodiment, the mobile device 102 may comprise a first near field communication transceiver 106 and a secure element 108. The mobile device 102 may further comprise a public land mobile network (PLMN) transceiver 140 that may be used for wireless communications via a base transceiver station 142. The base transceiver station 142 may communicate with the network 114 via wired or wireless links. In some embodiments of the present disclosure, the wireless link between the base transceiver station 142 and the mobile device 102 may be assumed to be unavailable, for example because the mobile device 102 is out of coverage, because the public land mobile network transceiver 140 is inoperable, or for another reason. The mobile device 102 may conduct a variety of electronic transactions based on confidential information contained in the secure element 108 including, but not limited to, credit card information, debit card information, transit card information, electronic coupon information, loyalty program information, electronic access code information, and other information. For example, the mobile device 102 may interact with a transit company fare gate (not shown) by establishing a near field communication link between the first near field communication transceiver 106 and the transit company fare gate. In response to the interaction with the transit company fare gate, for example when exiting the transit system after completing a trip on-board a vehicle operated by the transit company, a transit card application (not shown) in the secure element 108 may deduct an appropriate fare amount from a funds balance of the transit card application.

A variety of failure mechanisms may interfere with the proper functioning of the secure element 108, for example completing payment transactions and/or completing access transactions. The first near field communication transceiver 106 or other hardware components of the mobile device 102 may fail and prevent proper functioning. An application in the secure element 108 may be improperly loaded or may become corrupted, for example the transit card application discussed above, and prevent proper functioning. In embodiment, the agent computer 104 may be a work station operated by a transit company agent, but in other embodiments the agent computer 104 may be associated with other enterprises or entities, for example a bank or a building management office. In some contexts, the agent computer 104 may be referred to as a station, for example a station associated with an issuer of confidential information. The agent computer 104 may comprise a second near field communication transceiver 110 and a first diagnostic application 112. In an embodiment, the agent computer 104 may initiate diagnostics on the mobile device 102, for example when a user of the mobile device 102 approaches an operator of the agent computer 104 asking for help when the mobile device 102 cannot complete transit card transactions. The user of the mobile device 102 may provide an identification that is entered into the first diagnostic application 112, for example by the transit company agent. The first diagnostic application 112 may send a request for an access key, including the identification, to the provisioning server 116. In an embodiment, the provisioning server 116 may forward the request for the access key, including the identification, to the transit provider operator 118, and the transit provider operator 118 may return the access key retrieved from the store of access keys 120 based on the identification. As discussed above, in other embodiments the place of the transit provider operator 118 may be taken by other issuers and/or managers of confidential information, for example a bank, a credit card issuer, a debit card issuer, a loyalty program manager, a building access control office, and other managers of confidential information. Alternatively, in an embodiment, the provisioning server 116 may already know the access key associated with the identification. The provisioning server 116 returns the access key to the first diagnostic application 112.

The first diagnostic application 112 may communicate with the second diagnostic application 122 on the mobile device 102 to provide the access key and to trigger diagnostics on the mobile device 102. In an embodiment, the second diagnostic application 122 may perform relatively simple diagnostics directed to identifying a problem source at a high level. For example, the second diagnostic application 122 may only determine whether the problem is caused by hardware, by an application in the secure element 108, or another cause. In other embodiments, however, the second diagnostic application 122 may perform more comprehensive diagnostics. The second diagnostic application 122 may use the access key to invoke special functions of the secure element 108 or to obtain direct access to the secure element 108. Alternatively, the second diagnostic application 122 may use the access key to invoke a third diagnostic application 124 in the secure element 108. The diagnostic applications 112, 122, 124 may comprise computer programs and/or computer instructions.

In an embodiment, the second diagnostic application 122 may provide only a link or interface between an external entity invoking the diagnostic functions of the third diagnostic application 124, for example passing the external diagnostics request to the third diagnostic application 124. In an embodiment, the second diagnostic application 122 may additionally provide authentication of the entity invoking the diagnostic functions of the third diagnostic application 124, for example authenticating the agent computer 104. The access key may be stored by the second diagnostic application 122 for later use, for example for reinstalling instructions and/or writing to the secure element 108. The third diagnostic application 124 may execute instructions to determine the integrity of memory and/or an application in the secure element 108. Determining integrity of the memory may involve testing hardware and/or the data and/or the instructions stored in the memory in the secure element 108. In another embodiment, the first diagnostic application 112 may control the execution of diagnostics and invoke functions of the second diagnostic application 122 and/or the third diagnostic application 124 via the near field communication link between the second near field communication transceiver 110 and the first near field communication transceiver 106.

Results of the diagnostics may be returned by the second diagnostic application 122 to the first diagnostic application 112 to be displayed by an interface of the agent computer 104 or may be displayed by an interface of the mobile device 102. In the case that an application stored in the secure element 108, for example a transit card application, was improperly installed or has become corrupted, the agent computer 104 may reinstall the application on the secure element 108, for example by conducting a provisioning session over a near field communication link between the first near field communication transceiver 106 and the second near field communication transceiver 110.

In an embodiment, the second diagnostic application 122 may be invoked with a user interface of the mobile device 102 and may conduct diagnostics without communicating with the agent computer 104, the provisioning server, or the transit provider operator 118. In an embodiment, the second diagnostic application 122 may store the access key obtained as described above and use the stored access key to access the secure element 108 and/or to invoke the third diagnostic application 124. Alternatively, in an embodiment, an access key may not be required by the second diagnostic application 122 to access the secure element 108 and/or to invoke the third diagnostic application 124.

Figure 2:
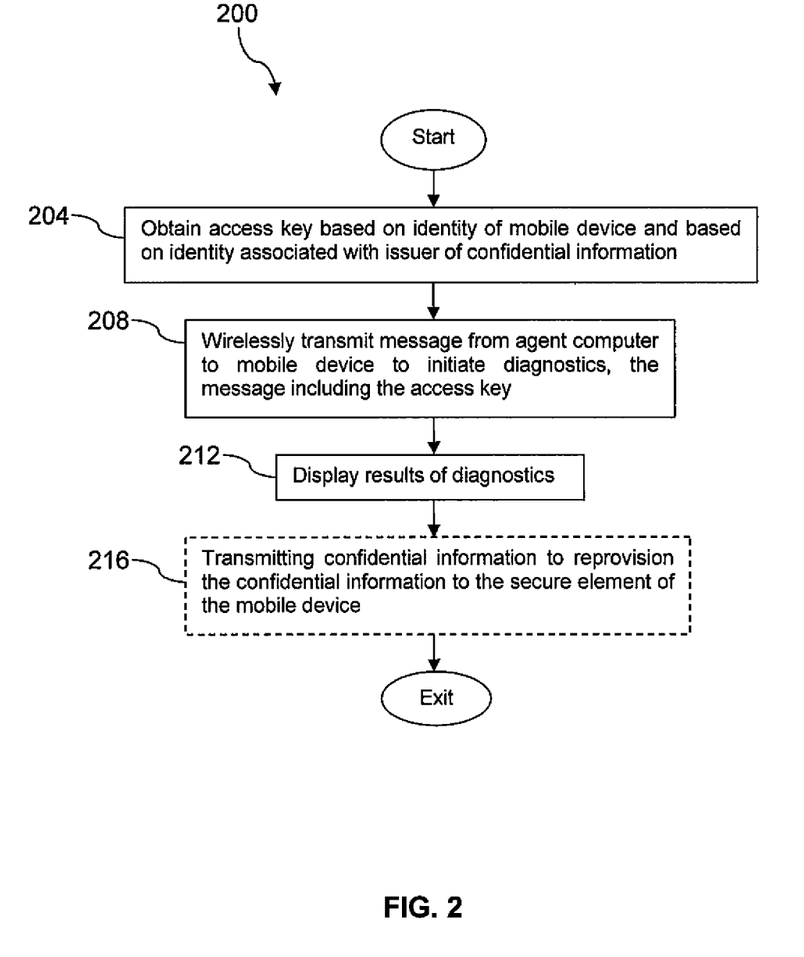
FIG. 2 is a flow chart of a diagnostic method according to an embodiment of the disclosure.

Turning now to FIG. 2, a method 200 of performing on-board diagnostics is discussed. At block 204, an access key is obtained based on an identity of the mobile device 102, for example a telephone number associated with the mobile device 102, an equipment identification number of the mobile device 102, or other identity. The access key may be obtained in a variety of manners including requesting the access key from the provisioning server 116, requesting the access key from the transit provider operator 118, requesting the access key from some other party associated with confidential information including credit card issuers, debit card issuers, building physical security offices, and other entities.

At block 208 the agent computer 104 wirelessly transmits the access key to the mobile device 102 to initiate diagnostics, for example by invoking the second diagnostics application 122. At block 212, the results of the diagnostics are displayed on the agent computer 104 and/or on the mobile device 102. At block 216, confidential information is optionally reprovisioned to the mobile device 102, for example in the case that diagnostics indicated that the confidential information stored in the secure element 124 had been corrupted. The confidential information may be credit card account information, debit card account information, transit card account information, transit token information, electric coupon information, loyalty program information, electronic badge information, electronic access code information, and other such confidential information. In some embodiments, the confidential information may include executable applications that promote electronic payment by the mobile device, for example an electronic credit card application and/or an electronic transit card application.

Figure 3:
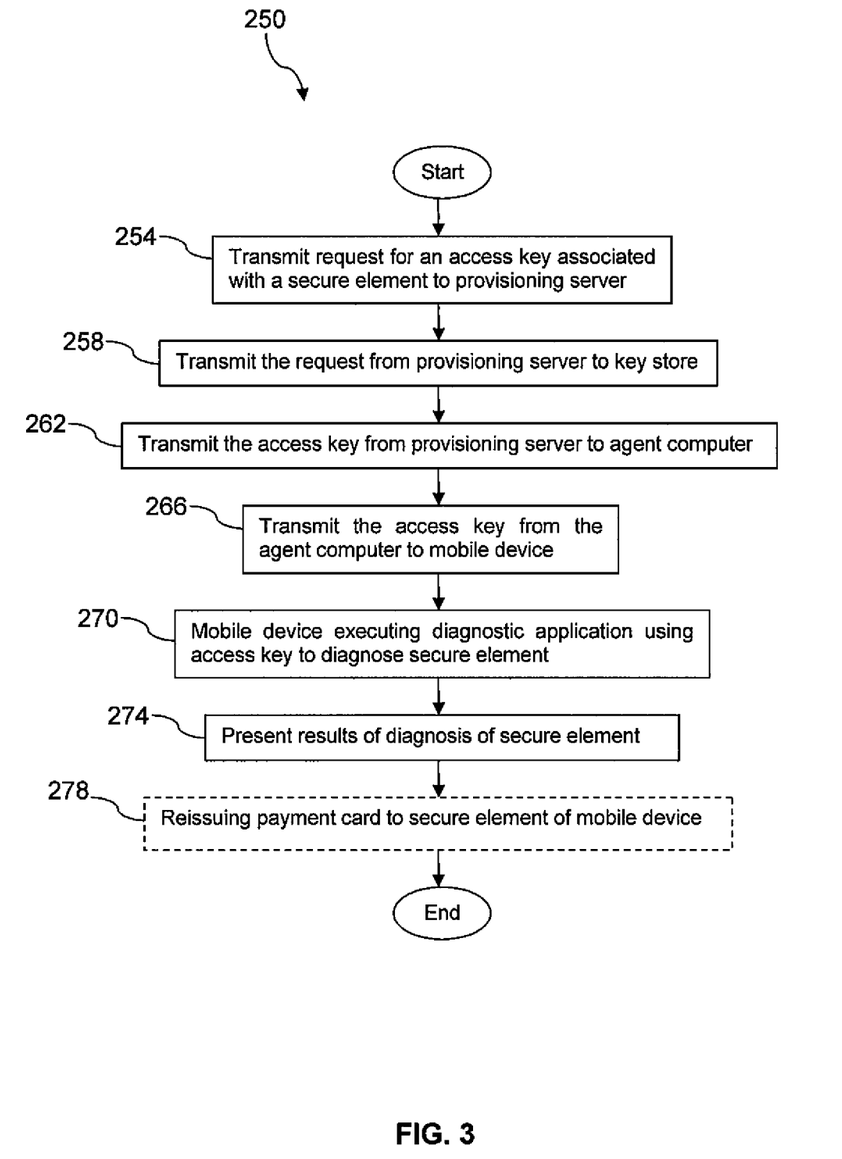
FIG. 3 is a flow chart of another diagnostic method according to an embodiment of the disclosure.

Turning now to FIG. 3, a method 250 of performing on-board diagnostics is discussed. In block 254, a request for an access key associated with the secure element 108 is transmitted to the provisioning server 116. At block 258, the provisioning server 116 transmits the request to a key store, for example the store of access keys 120. At block 262, the access key is transmitted from the provisioning server 116 to the agent computer 104. At block 266, the access key is transmitted from the agent computer 104 to the mobile device 102. At block 270, the mobile device 102 executes the second diagnostic application using the access key to diagnose the secure element 108. At block 274, the results of the diagnosis of the secure element 108 are presented, for example on a display of the mobile device 102 and/or on a display of the agent computer 104. At block 278, a payment card is optionally reissued to the secure element 108 by the agent computer 104, for example in the case that the payment card stored in the secure element 108 had become corrupted. Block 278 may further involve various steps of reinstalling and reconfiguring at least portions of the secure element 108 and of the mobile device 102, for example reinstalling payment applications, reinstalling device drivers of the mobile device 102, redoing personalization of electronic card applications, and other reinstallations and/or reconfigurations. Personalization of an electronic credit card and/or other electronic payment card may comprise writing a unique account number, an authentication code, a shared secret, a funds balance, and other information to the secure element 108 that is specific to the mobile device 102 and/or the subject electronic card.

Figure 4:
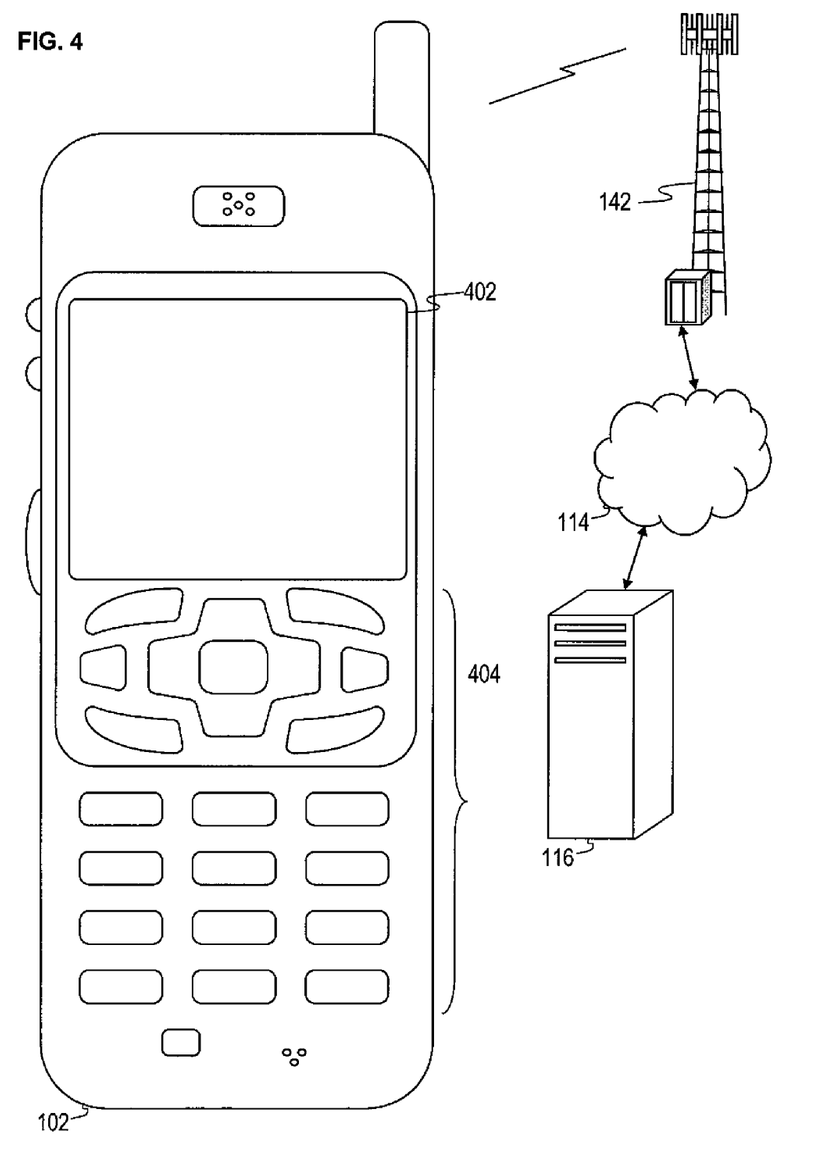
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a portable computer, a tablet computer, or a laptop computer. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer handset 102.

The mobile device 102 may execute a web browser application which enables the display 402 to show a web page. The web page may be obtained via wireless communications with the base transceiver station 142, a wireless network access node, a peer handset 102 or any other wireless communication network or system. The base transceiver station 142 (or wireless network access node) is coupled to the network 114. Via the wireless link and the wired network, the mobile device 102 has access to information on various servers, such as the provisioning server 116. The provisioning server 116 may provide content that may be shown on the display 402. Alternately, the mobile device 102 may access the base transceiver station 142 through a peer handset 102 acting as an intermediary, in a relay type or hop type of connection.

Figure 5:
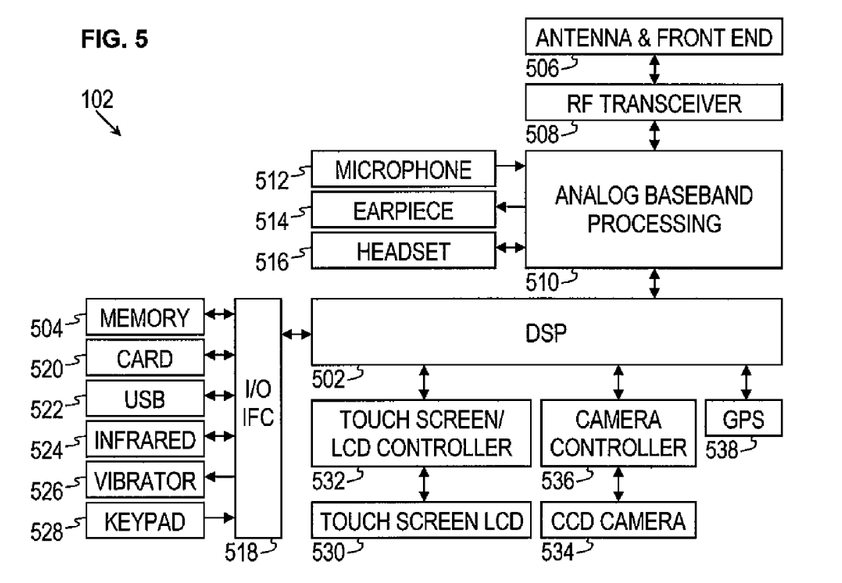
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the mobile device 102 may include a card or other device for promoting near field communications, for example the first near field communications transceiver 106. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
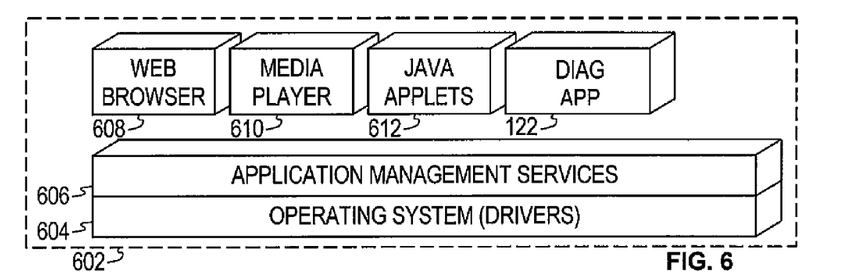
FIG. 6 is an illustration of a software architecture of a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, a plurality of JAVA applets 612, and the second diagnostic application 122. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
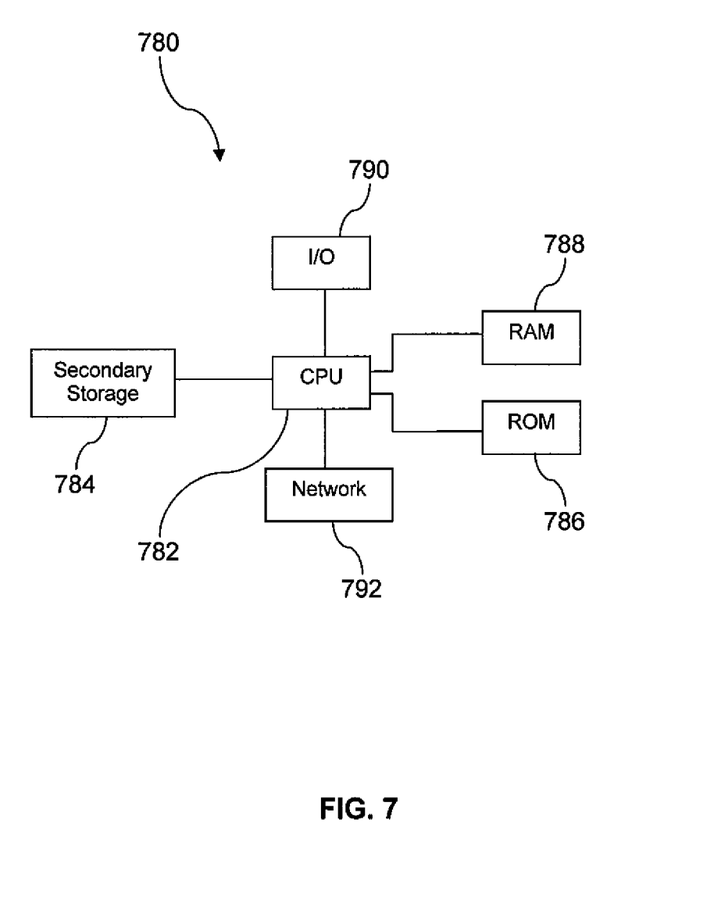
FIG. 7 illustrates an exemplary general purpose computer system suitable for implementing some aspects of the several embodiments of the disclosure.

Aspects of the system 100 described above, for example the agent computer 104, the provisioning server 116, and the transit provider operator 118, may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, near field communication (NFC) cards, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of diagnosing an electronic transaction functionality of a mobile device, comprising:
    in response to failure of an electronic transaction functionality of the mobile device, obtaining, by a station associated with an issuer of confidential information for use with electronic transactions, an access key from a remote key store based on an identity of the mobile device and based on an identity associated with the issuer of the confidential information, wherein the access key is associated with a secure element of the mobile device storing the confidential information;
    wirelessly transmitting, by the station, the access key initially obtained from the remote key store to the mobile device;
    executing, by the mobile device, a mobile device diagnostic application stored on the mobile device in response to communication from the station, wherein the mobile device diagnostic application further diagnoses a hardware functionality of the mobile device and a payment application functionality, and wherein the payment application is installed on the mobile device;
    using, by the mobile device diagnostic application, the access key received from the station to initiate a secure element diagnostic application stored in the secure element to test the electronic transaction functionality; and
    displaying the result of the diagnostics.

2. The method of claim 1, further including when the displayed result of the diagnostics indicates the confidential information is inoperable, wirelessly transmitting replacement confidential information from the station to the mobile device to re-provision the confidential information on the secure element.

3. The method of claim 1, wherein the displaying the result of the diagnostics is performed by the station.

4. The method of claim 1, wherein the displaying the result of the diagnostics is performed by the mobile device.

5. The method of claim 1, wherein the confidential information is electronic transit card information and the issuer is an operator of a transit system.

6. The method of claim 1, wherein the confidential information is at least one of credit card information, debit card information, loyalty program information, coupon information, electronic access information, transit card information, or transit token information.

7. The method of claim 1, wherein the confidential information is at least one of building electronic access information or electronic computer system access information.

8. A method of diagnosing an electronic transaction functionality of a mobile device, comprising:

in response to failure of an electronic transaction functionality of the mobile device, transmitting, by a service station, a request for an access key to a provisioning server based on an identity of the mobile device, wherein the access key is associated with a secure element of the mobile device storing confidential information for use with performing electronic transactions;

transmitting, by the provisioning server, the request for the access key to a remote key store;

transmitting, by the provisioning server, the access key to the service station;

transmitting, by the service station, the access key to the mobile device;

executing, by the mobile device, a mobile device diagnostic application stored on the mobile device in response to communication from the service station, wherein the mobile device diagnostic application further diagnoses a hardware functionality of the mobile device and a payment application functionality, and wherein the payment application is installed on the mobile device;

using, by the mobile device diagnostic application, the access key received from the provisioning server to invoke a secure element diagnostic application stored in the secure element to diagnose the secure element; and presenting the results of the diagnosis of the secure element.

9. The method of claim 8, further including the service station reissuing a payment card to the secure element of the mobile device based on the results of the diagnosis of the secure element.

10. The method of claim 8, wherein the service station is a station operated by an agent of a transit company.

11. The method of claim 8, wherein the access key is encrypted using public key encryption methods by the key store, and wherein decryption of the access key depends upon a private key associated with the secure element.

12. The method of claim 8, wherein the access key is hidden from an operator of the service station.

13. A mobile device, comprising:
a secure element;
a processor;
a wireless communication transceiver configured to receive an access key from a remote diagnostic controller based on an identity of the mobile device in response to failure of an electronic transaction functionality of the mobile device, wherein the access key is initially obtained from a remote key store; and
a mobile device diagnostic application that, when executed by the processor of the mobile device and in response to the wireless communication transceiver receiving the access key, uses the access key initially obtained from the remote key store to invoke a secure element diagnostic application stored in the secure element to perform diagnostics of the electronic transaction functionality, wherein the mobile device diagnostic application is initially executed in response to communication from the remote diagnostic controller, wherein the mobile device diagnostic application further diagnoses a hardware functionality of the mobile device and a payment application functionality, and wherein the payment application is installed on the mobile device.

14. The mobile device of claim 13, wherein the secure element comprises a smart card integrated circuit chip.

15. The mobile device of claim 13, wherein the secure element comprises a secure application and a secure memory area reserved for exclusive access by the secure application.

16. The mobile device of claim 13, wherein the mobile device is one of a mobile phone, a personal digital assistant, a media player, a camera, a wrist watch, an identification badge, or a flexible card.

17. The mobile device of claim 13, wherein the mobile device diagnostic application uses the access key to perform diagnostics on the secure element.

18. The mobile device of claim 13, further including a display, wherein the mobile device diagnostic application presents a result of the diagnostics on the display.

* * * * *